(No Model.)
C. F. DE REDON.
BRAKE FOR BICYCLES.
No. 581,305. Patented Apr. 27, 1897.
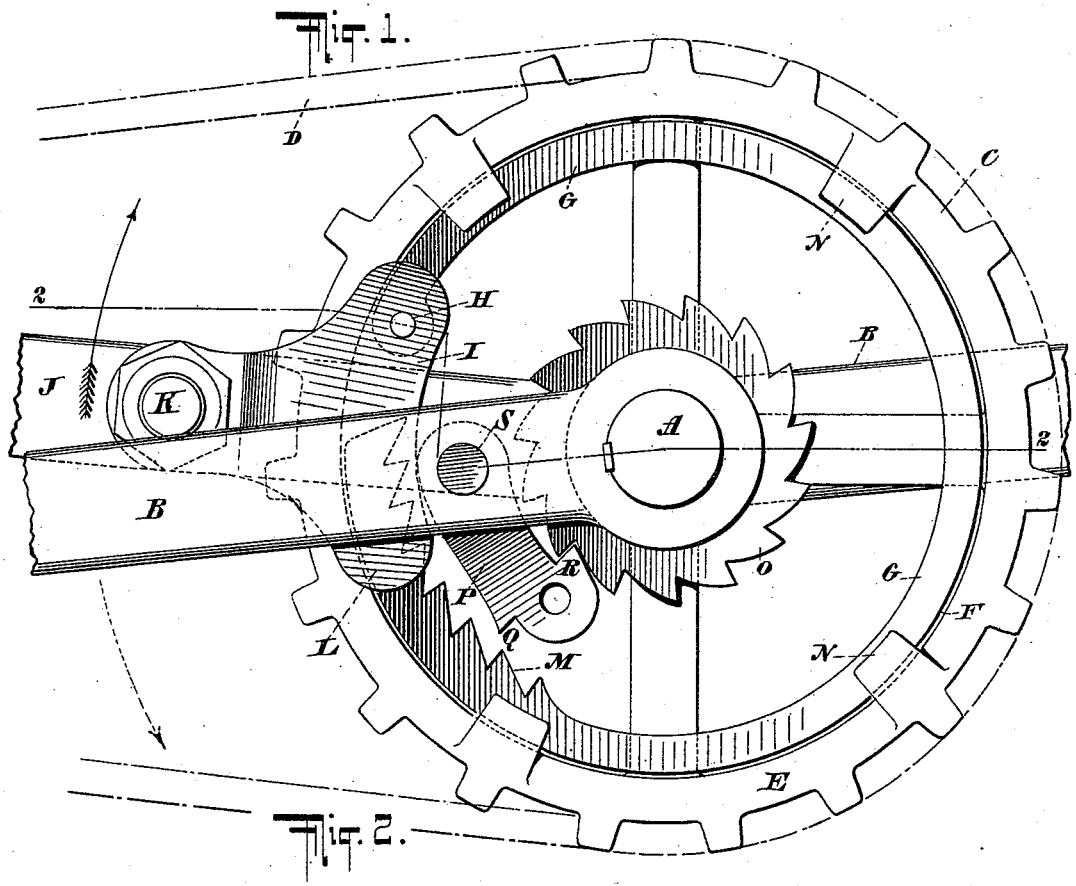
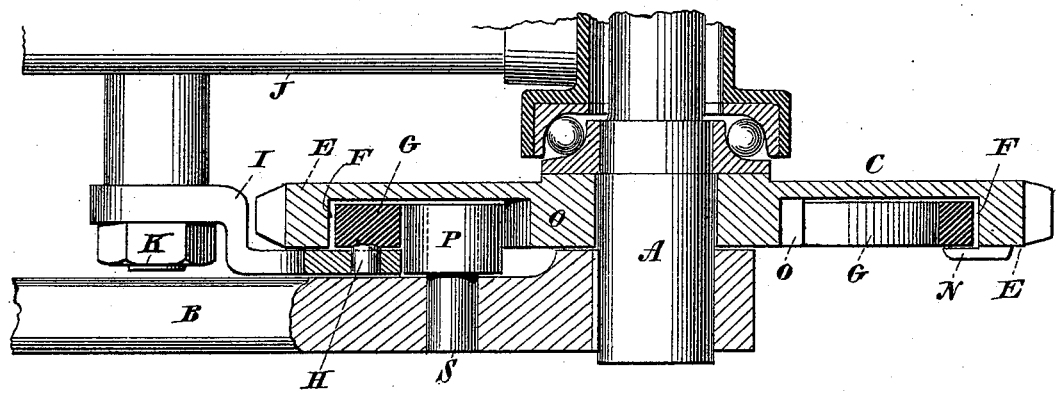
WITNESSES:
Gustave Dittrich
John Kehlenbeck
INVENTOR
Constant F. de Redon,
BY Chas. C. Gill
ATTORNEY.

UNITED STATES PATENT OFFICE.

CONSTANT F. DE REDON, OF NEW YORK, N. Y., ASSIGNOR TO HENRY CHAURANT AND AUGUSTUS W. PETERS, OF SAME PLACE.

BRAKE FOR BICYCLES.

SPECIFICATION forming part of Letters Patent No. 581,305, dated April 27, 1897.

Application filed June 15, 1896. Serial No. 595,534. (No model.)

*To all whom it may concern:*

Be it known that I, CONSTANT F. DE REDON, a citizen of France, and a resident of New York, in the county of New York and State of New York, have invented certain new and useful Improvements in Brakes for Bicycles or other Vehicles, of which the following is a specification.

The invention relates to improvements in bicycles, and pertains particularly to a novel brake operable from the crank-shaft under pressure applied in a reverse direction to the pedals and adapted to be applied to the sprocket-wheel on said shaft, said wheel being normally free upon the shaft. During the forward travel of the bicycle the action of the pedals and crank-shaft will, through the intermediate brake mechanism, connect the sprocket-wheel with said shaft, and hence at such time the motion of said shaft will be transmitted through the sprocket-wheel and the usual chain thereon to the sprocket-wheel on the rear axle of the bicycle. When it is desired to stop the wheel, the pedals will be arrested as nearly as may be when the pedal-arms are in a horizontal position in order thereby to free the intermediate brake mechanism from the sprocket-wheel, leaving the latter free upon the crank-shaft, and thereupon the rider will exert a reverse pressure upon the pedals tending to turn the latter in a reverse direction, whereby with the proper gradual application of the pressure the brake mechanism will be caused to engage the sprocket-wheel and again connect it to a greater or less degree, according to the amount of pressure applied, with the crank-shaft, whereby the wheel may be brought to a stop within such distance as the rider may desire, the absolute stoppage of the wheel being wholly under the control of the rider.

The invention will be more fully understood from the detailed description hereinafter presented, reference being had to the accompanying drawings, in which—

Figure 1 is a side elevation, partly broken away, of that portion of the bicycle to which the brake mechanism constituting the present invention is directly applied; and Fig. 2 is a transverse section of same on the dotted line 2 2 of Fig. 1.

In the drawings, A designates the usual crank-shaft, B B the pedal-arms connected with the said shaft, and C the sprocket-wheel, which in the present instance is normally free upon the crank-shaft A and is in the usual manner connected by the sprocket-chain D with the usual sprocket-wheel on the rear axle. (Not shown.) The sprocket-wheel C is formed with the rim E, whose inner surface forms an annular shoulder F to receive the brake-spring G, which at one end is secured by the pin H to the plate I, which is rigidly connected with the lower rear frame J of the wheel by means of the bolt K. The plate I projects over the rim of the wheel C in suitable relation to receive at its upper end the pin H and at its lower end L to form a guide or protector for the free end of the spring G, which end is provided with a series of ratchet-teeth M. The spring G in its normal condition is in close relation to the shoulder F, formed on the rim E, but is free of said shoulder, and said spring is retained in position within the rim of the sprocket-wheel by means of the lugs N or any other suitable means.

Upon the hub of the sprocket-wheel C is formed the toothed or ratchet wheel O, and upon the pedal-arm B, adjacent to said ratchet-wheel O, is pivotally secured the pawl P, having the detents lettered Q R, the latter being adapted for engagement with the ratchet-wheel O, while the detent Q is intended solely for engagement with the teeth M on the spring G.

When the wheel is moving forward and the pedal-arm B is moving in the direction of the arrow shown by full lines in Fig. 1, the detent R of the pawl P will, as illustrated in Fig. 1, engage the ratchet-wheel O and thereby form a connection between the pedal-arm, crank-shaft, ratchet-wheel, and sprocket-wheel C, with the result that the power applied to the pedals will rotate the crank-axle A, sprocket-wheel C, and, through the chain D, the rear sprocket-wheel. (Not shown.) When it is desired to arrest the movement of the wheel, the pedal-arm B will be stopped when it is about at a horizontal position, and at such time the pawl P will have the forward pressure relieved from it, and it will of its own weight turn downward upon its pivotal point S and free its detent R from the ratchet-wheel O, thus again leaving the sprocket-wheel C free upon the crank-shaft. The pressure of the foot is then exerted in the reverse direction upon the pedal connected with the arm B for the purpose of causing the pawl P, through its detent Q, to exert a pressure against the free end of the spring G, one of whose teeth M will be engaged by said detent Q as soon as the pawl P releases itself from the ratchet O. The downward pressure exerted by the pawl P against the spring M has the effect of driving the said spring outward in the line of its circular form and forcing the outer surfaces of the spring firmly against the shoulder F, thereby braking the sprocket-wheel and pedal-arm together and enabling the rider by continued pressure on the pedal-arm B to stop the wheel. The reverse pressure exerted by the rider upon the pedal-arm B will be applied gradually in order not to bring the wheel to an absolutely sudden stop. The reverse pressure on the pedal-arm B and through said arm and pawl P against the spring G and sprocket-wheel C may be applied as gradually as desired and in accordance with existing conditions. By means of the brake constructed and arranged in accordance with my invention the rider has absolute control of the wheel and may stop the same within any desired distance and as suddenly or slowly as may be preferred.

The invention is not limited exclusively to bicycles, but constitutes a brake which may with propriety be applied to other vehicles or mechanisms.

What I claim as my invention, and desire to secure by Letters Patent, is—

1. In a brake mechanism, the power-shaft, the normally free driving-wheel thereon, and the crank for rotating said shaft, combined with the ratchet-wheel applied to rotate with said shaft, the spring within the rim of said wheel rigidly held at one end, and the pawl carried by said crank and adapted during its forward motion to engage said ratchet-wheel and during its reverse motion to engage the free end of said spring; substantially as set forth.

2. In a brake mechanism, the power-shaft, the normally free driving-wheel thereon, and the crank for rotating said shaft, combined with the ratchet-wheel applied to rotate with said shaft, the toothed spring rigidly held at one end and arranged within the rim of said wheel, and the pawl carried by said crank and adapted during its forward motion to engage said ratchet and during its reverse motion to engage the free end of said spring; substantially as set forth.

3. In a bicycle or other vehicle, the crank-shaft, the pedal-arms thereon, and the driving sprocket-wheel normally free on said shaft, combined with the spring arranged within the rim of said wheel held rigidly at one end and having ratchet-teeth at the other, the ratchet-wheel applied to rotate with said shaft, and means carried by the pedal-arm to engage said ratchet-wheel during the forward motion of said arm and to engage the teeth of said spring during the reverse motion of said arm; substantially as set forth.

4. In a bicycle or other vehicle the crank-shaft, the pedal-arms thereon, and the driving sprocket-wheel normally free on said shaft, combined with the spring arranged within the rim of said wheel held rigidly at one end and having ratchet-teeth at the other, the ratchet-wheel applied to rotate with said shaft, and the pawl having detents and carried by the pedal-arm to engage said ratchet-wheel during the forward motion of said arm and to engage the teeth of said spring during the reverse motion of said arm; substantially as set forth.

5. In a bicycle or other vehicle, the crank-shaft, the pedal-arms rigid thereon, and the driving sprocket-wheel C directly mounted on said shaft but normally free thereon, said sprocket-wheel comprising in an integral piece the central hub, the toothed rim E forming the interior annular shoulder F, and the spoke connection intermediate said rim and hub, combined with the spring G which is rigidly secured at one end and thence extends along said shoulder to its free end, means for locking said wheel to said shaft during the forward motion of said arms, and means for applying pressure to the free end of said spring and in line with the length of said spring thereby driving the latter to swell outward between its ends and against the inner periphery of said shoulder F for locking said wheel to said shaft during the reverse motion of said arms; substantially as set forth.

Signed at New York, in the county of New York and State of New York, this 12th day of June, A. D. 1896.

CONSTANT F. DE REDON.

Witnesses:
CHAS. C. GILL,
E. JOS. BELKNAP.